United States Patent
Loesch et al.

[11] 3,880,110
[45] Apr. 29, 1975

[54] SHAFT OPERATION MONITOR

[76] Inventors: Leo J. Loesch; Claude E. Loesch, both of Kimball, Minn. 55353

[22] Filed: July 30, 1973

[21] Appl. No.: 384,030

[52] U.S. Cl. .............................. 116/115; 116/117
[51] Int. Cl. .................................... G01p 3/28
[58] Field of Search ............. 116/115, 117, 117 B; 73/644, 206, 209, 302, 439, 194 M

[56] References Cited
UNITED STATES PATENTS

| | | | |
|---|---|---|---|
| 470,468 | 3/1892 | Boyer | 73/502 X |
| 1,100,867 | 6/1914 | Dexter | 73/302 |
| 1,120,482 | 12/1914 | Heaton | 73/502 X |
| 2,252,883 | 8/1941 | Everson | 73/209 |
| 3,259,054 | 2/1966 | Vanzo, Jr. et al. | 73/209 X |

FOREIGN PATENTS OR APPLICATIONS

| | | | |
|---|---|---|---|
| 1,056,222 | 10/1953 | France | 73/502 |

*Primary Examiner*—S. Clement Swisher
*Assistant Examiner*—Denis E. Corr
*Attorney, Agent, or Firm*—H. Dale Palmatier; James R. Haller

[57] ABSTRACT

An apparatus for monitoring the rotation of a shaft, and for self-monitoring of the apparatus itself. The rotational motion of the shaft operates an air pump which generates a stream of air detected by a continuous air-flow indicator. Interruption of the continuous rotation of the shaft is sensed by visual observation of the air-flow indicator.

9 Claims, 6 Drawing Figures

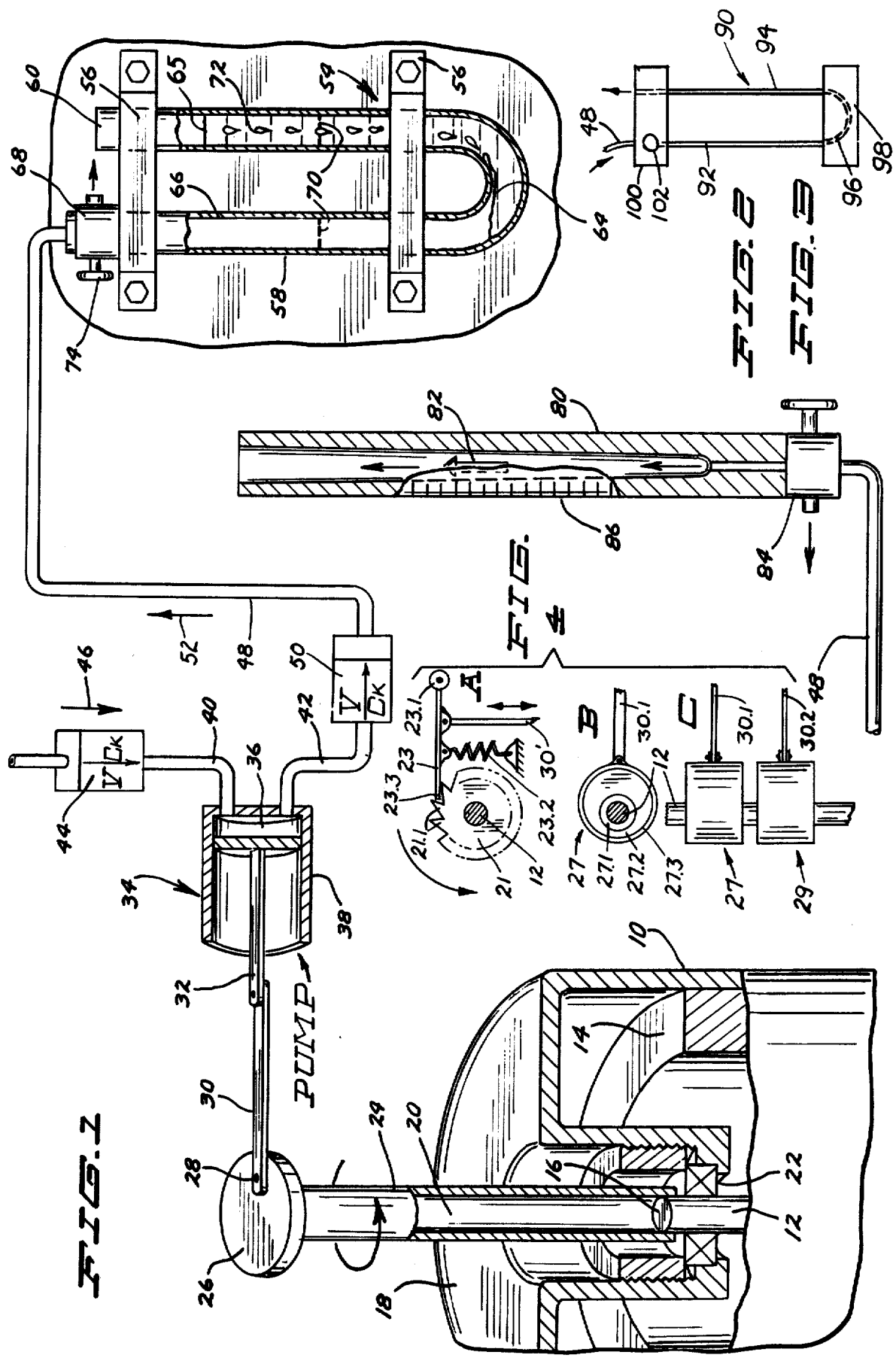

SHAFT OPERATION MONITOR

BACKGROUND OF THE INVENTION

The present invention relates to the monitoring of moving machinery, and particularly to the monitoring of the continuous rotation of a shaft.

In the agricultural industry, machines such as blenders or mixers employ a rotating shaft about the circumference of which may be placed mixing paddles and the like. Such shafts are often concealed from the view of the operator, or are difficult to see from a distance of several yards or more. The operators of such machines often are positioned in a place remote from the operated machines themselves, such as in a central control room. Many of such machines operate at but a single speed, and the operator hence requires knowledge only of whether such machines are operating or not. More sophisticated machines may have speed controls, temperature controls, and the like. Except when operating relatively sophisticated machines wherein the parameters of speed, temperature, et cetera are led back to the control room to be monitored, an operator often cannot positively tell whether the machines which he controls are operating or not. To make sure of their continued operation, the operator must leave his post and personally examine the machines. This problem becomes particularly important when time-dependent machine operations are being carried out. For example, if the contents of a heated, shaft-driven mixing vessel have become so viscous as to stop the movement of paddles connected to the shaft, the contents of the vessel may congeal into a hard, useless mass which is thereafter very difficult to remove. An inexpensive, self-monitoring readback system which would permit an operator remote from a shaft-driven machine to monitor shaft rotation is much to be desired.

BRIEF SUMMARY OF THE INVENTION

Briefly, the present invention provides a self-monitoring apparatus for continuously monitoring the rotation of a shaft. The apparatus comprises an air pump, energy transmitting means adapted to transmit energy of a rotating shaft to the air pump to cause the latter to emit air under pressure, and an air-flow indicator communicating with the air pump and capable of providing continuous visual indication of the continuous flow of air thereto. In a preferred embodiment these elements cooperate to provide the apparatus with a dead-time interval of not greater than about five seconds, and preferably not greater that about one second. The apparatus itself is self-monitoring; that is, operation of the apparatus itself in response to rotation of a shaft is continuously signaled to the operator.

BRIEF DESCRIPTION OF THE DRAWING

FIG. 1 is a partially schematic representation of the invention, with parts thereof shown partially broken away and in partial cross-section;

FIG. 2 is a perspective view of a continuous air-flow indicator, shown in partial cross-section and partially broken away;

FIG. 3 is a broken away view of an air-flow indicator of the invention;

FIG. 4A is a broken away top view of a shaft with a modified attachment; and

FIGS. 4B and C are broken away top and side views, respectively, of a shaft with another modified attachment.

DETAILED DESCRIPTION OF THE INVENTION

Referring to FIG. 1, a shaft-driven apparatus such as an enclosed mixer 10 is provided with a rotating shaft 12 about which are mounted radially extending mixing paddles 14. For safety reasons, it may be desired that the end 16 of the rotating shaft not protrude from the end 18 of the mixer; hence, the end of the shaft exits from the mixer at a well-shaped depression 20 therein. The end of the shaft may be supported by a bearing 22 which may be of a type designed to prevent leakage of the contents of the mixer about the periphery of the shaft 12.

Attached to the protruding end 16 of the shaft is a tubular connector member 24, the lower end of which elastically may be slipped over the end of the shaft, thereby permitting the tubular member 24 to be easily attached to and detached from the shaft. The tubular shaft 24 is preferably flexible, and may be made, for example, of rubber or a flexible plastic such as polyethylene. At its upper end, tubular connector 24 is attached centrally of a rotor 26 having a protruding lug 28 adjacent its periphery. Lug 28 in turn is joined through arm 30 to the piston 32 of an air pump designated generally as 34 such that rotation of the rotor 26 in response to rotation of shaft 20 causes the arm 30 and piston 32 to oscillate. The chamber 36 of the cylinder 38 in which the piston 32 oscillates is provided with air inlet and outlet ports 40 and 42 respectively. Outlet port 40 communicates with the atmosphere through an ordinary check valve 44 (shown schematically) so that air passes into the inlet port 40 only in the direction of arrow 46. In similar fashion, outlet port 42 is connected to an air line 48 through check valve 50, which permits air to flow only out of the port 42 in the direction of arrow 52. The air pump and check valves are ordinarily located adjacent the mixer 10. Check valve 50, which receives air from air pump 48, transmits the air under pressure through air line 48 to the inlet port of a continuously operating air-flow indicator such as the inverted U-tube device designated generally as 54. Air tube 48 may be of any convenient diameter, but preferably has an internal diameter of not greater than about ⅛ inch. The flow meter 54 may be conveniently located in a remote, central control room, and the air line 48 leading thereto from check valve 50 may be passed through walls, et cetera. As will be more fully explained below, the internal diameter of air tube 48 preferably is kept to a minimum consistant with successful operation of the monitoring apparatus. Diaphragm pumps (such as those wherein a fixed diaphragm is caused to bow inwardly and outwardly of the cylinder in response to oscillation of the arm 30) are preferred. Normally, the amplitude of oscillations required is comparatively smaller, and the oscillation frequency greater for such pumps in comparison to piston pumps.

Air-flow indicator 54 may be attached to a wall of the control room through brackets 56 and comprises a U-shaped clear glass tube 58, one end 60 of which is open to the atmosphere and the other end 66 of which communicates with air line 48 through bleeder valve 68. When air under pressure flows into the end 66 of the tube, water or other liquid in the tube is forced from its original levels 70 (shown as dashed lines) to new levels, the liquid in the left-hand tube being forced downwardly under air pressure and the level in the right-hand tube rising accordingly, thus visually indicating the continuous flow of air to the indicator. An increase in air pressure will drive the liquid level in the left-hand tube further downward until, at the level shown at 64, air may escape to the right-hand tube as a visually observable stream of bubbles 72 which rise to the level 65 of the liquid in that tube, thus providing a second indication of the continuous flow of air to the indicator.

Bleeder valve 68, which may be a needle valve, is operated by handle 74 and serves to bleed off regulated quantities of air from air tube 48. By adjustment of valve 68, the sensitivity of the air-flow indicator may be varied widely to accomodate monitoring of shafts having differing speeds of rotation. For example, the apparatus of the invention may be designed to monitor shaft speeds of 2 to 25 r.p.m. or from 20-2,000 r.p.m. At very slow shaft rotation speeds, the oscillations of the pump 34 may cause the liquid level in U-tube 58 to oscillate, whereas at higher speeds this effect is largely damped out. The liquid which is employed is preferably colored so that it may be easily seen, and may be, for example, water, ethylene glycol, etc.

FIG. 2 represents another example of a continuous air-flow indicator and comprises a vertical section of round glass tubing 80 having upwardly diverging inner walls and into which is inserted a weight 82 adapted to be lifted by air flowing upwardly therein. A barrier is provided at the upper end of the tubing to prevent escape of the weight, and the lower end of the glass tubing is connected, through bleeder valve 84, to air tube 48. As before, the bleeder valve is used to regulate the amount of air which passes from the air tube 48 into the rotameter by bleeding air at a regulated rate from the valve to the atmosphere.

Referring to FIG. 3, a U-shaped tube 90 is comprised of vertical sections 92 and 94 which are joined at their lower ends by transverse tube 96. The latter tube may be formed in a supporting block 98 into which the lower ends of the vertical sections 92 and 94 may be threaded or otherwise affixed. The upper ends of the tube sections 92 and 94 are supported by block 100 which enables the right-hand tube section 94 to communicate with the atmosphere. The left-hand section 92 communicates with the air tube 48 through a bleeder valve which is formed in the block 100 and which is operated by handle 102.

The continuous air-flow indicators of the present invention are substantially instantaneously responsive to changes in the flow rate of air flowing thereto. For example, if the flow of air to the U-shaped tube indicator 54 is interrupted, the level of liquid in this tube changes, and if bubbles had been observed, the bubbles immediately stop rising within the tube. Similarly, if the supply of air through air tube 48 is interrupted to the indicator of FIG. 2, the weight 82 immediately falls to the bottom of the glass tube 80. Further, the continuous air-flow indicators of the present invention yield a continuous visual indication of the flow of air thereto. For example, the levels of liquid in the left-hand and right-hand tubes continuously differ in height, and bubbles continuously rise in the U-tube flow meter 54. The weight is continuously maintained in an elevated position in the flow indicator of FIG. 2. As a result, any breakdown in the monitoring apparatus itself is manifested visually by the continuous air-flow indicators.

FIGS. 4A, 4B and 4C show modified versions of connections to a rotating shaft. Referring to FIG. 4A, a ratchet 21 is connected to the shaft 12 by set-screws or the like. A pawl 23 is pivotally connected at 23.1 to a stationary frame (not shown) and is urged toward the teeth 21.1 by a spring 23.2 which is connected in tension between the pawl 23 intermediate its length and the stationary frame. The end 23.3 of the pawl contacts the teeth 21.1 and rises and falls upon sequentially contacting the ratchet teeth as the shaft 12 rotates, thus causing the arm 30' which is connected at one end to the pawl, to oscillate and drive the air pump. In FIGS. 4B and 4C, the rotating shaft 12 is provided with two connections 27 and 29 to two air pumps (not shown) through connecting arms 30.1 and 30.2 respectively, each air pump leading to a separate continuous air-flow indicator. Connector 27 is provided with unidirectional, annular inner and outer clutch sleeves 27.1 and 27.2, the inner sleeve being rigidly affixed to the shaft 12. Outer clutch sleeve 27.2 has an outer surface which is eccentric to the shaft 12, as shown best in FIG. 4B, and is provided with an outer annular follower sleeve 27.3 which is slidably mounted on the outer surface of sleeve 27.2 so that eccentric sleeve 27.2 rotates within follower sleeve 27.3. Connecting arm 30.1 is in turn connected to the follower sleeve 27.3 so that when outer clutch sleeve 27.2 rotates about the axis of the shaft 12, in response to rotation of the latter, the connecting arm 30.1 is caused to oscillate by virtue of its attachment to the non-rotating follower sleeve 27.3. The clutch sleeves 27.1 and 27.2 are connected by a unidirectional clutch mechanism such as a ratchet 27.4 and pawl 27.5 mechanism so that these clutch sleeves are locked for rotation together when the shaft 12 rotates in one direction, but are unlocked for free rotational movement of the inner sleeve 27.1 within the outer sleeve 27.2 when the shaft 12 rotates in the opposite direction. Connector 29 is identical to the connector 27 except that the clutch action is reversed. In this manner, the clutch mechanism of either connector 27 or 29 is always locked and the other unlocked when the shaft 12 rotates so that only one of the pumps connected respectively to arms 30.1 and 30.2 is operated at a time. By viewing the two air-flow indicators respectively connected to the two pumps, an operator can tell whether the shaft 12 is rotating and, if so, the direction of rotation by noting which of the air-flow indicators shows the delivery of air thereto.

As noted above, it is often necessary for an operator of mixing equipment and the like to be appraised immediately of a stoppage in such equipment. It is thus desired that the continuous-reading flow indicators of the invention be immediately responsive not only to air transmitted thereto, but also provide substantially instantaneous indications of changes in the rotation of a monitored shaft. The element of time between the instant a change occurs in the rotation of a shaft and the instant that this change is visually apparent in a continuous-reading air-flow indicator of the invention is referred to herein as "dead-time." The dead-time of the monitoring apparatus of the present invention is dependent upon a number of factors, among which may be listed the volume of air $V_1$ pumped by air pump 34 through air tube 48 for each revolution of the monitored shaft 12, and the volume $V_2$ of the apparatus through which air passes downstream from the air pump (towards the flow meter). If the ratio $V_1/V_2$ is reasonably large, then the dead-time of the apparatus will be small; if on the other hand this ratio is small, then the dead-time will be larger. To obtain short dead-time periods, it is hence desirable to have the air pump 34 pump relatively large quantities of air for each revolution of the monitored shaft 12, and to have the volume of the apparatus downstream from the pump quite small. For this reason, it is desired that the inner diameter of the air tubing 48 be made as small as possible so as to decrease volume $V_2$. In preferred embodiment, the ratio $V_1/V_2$ is chosen as to provide the apparatus with a dead-time of not greater than about 5 seconds, and in a most preferred embodiment the dead-time is not greater than about 1 second.

By judicious control of the bleeder valves illustrated in the drawing as 74 and 84, the apparatus of the invention may be made not only to provide an "on-off" indication of shaft rotation, but may also provide an indication of the speed of rotation of the shaft. For example, by adjustment of needle valve 84 of the flow indicator shown in FIG. 2, the weight 82 therein may be made to assume a position near the bottom of the tube corresponding to a low speed rotation of the shaft 12, and to assume a relatively elevated position when the shaft is rotated at a greater speed. A scale 86 may be provided along the side of the indicator and may be correlated with the speed of rotation of the shaft 12. In similar fashion, the height differential of the liquid levels, or the rate of bubble production in the U-shaped flow indicator designated 54 in FIG. 1 may provide an indication of the rotational speed of the shaft 12.

In use, the tubular connector member 24 is attached to a shaft so that shaft rotation causes air to be pumped by pump 34 into air tube 48. The air-flow indicator is then observed, and any needed adjustments are made to the bleeder valve so that the indicator shows the desired reading. For shafts which have varying rotational speeds, the bleeder valve may be adjusted so that the flow indicator mirrors shaft rotation at both the lowest and the highest rotational speed which may be encountered.

While I have described a preferred embodiment of the present invention, it should be understood that various changes, adaptations, and modifications may be made therein without departing from the spirit of the invention and the scope of the appended claims.

What I claim is:

1. Self-monitoring apparatus for continuously monitoring the rotation of a shaft, comprising an air pump, energy transmitting means transmitting energy of a rotating shaft to the air pump to cause the latter to emit air under pressure, a substantially instantaneously responsive air-flow indicator and an air line connecting the pump and indicator and carrying said air under pressure from the pump to the indicator, the indicator providing continuous visual indication of the continuous flow of air thereto and having an adjustable bleeder valve at its inlet for bleeding to the atmosphere before said indicator a regulated portion of air under pressure received through the air line.

2. The monitoring apparatus of claim 1 wherein said indicator comprises a vertical, transparent tube connected at its bottom to the air line and having upwardly diverging inner walls and a weight contained therein and adapted to be urged upwardly in response to air flowing upwardly in the transparent tube.

3. The monitoring apparatus of claim 1 wherein said air pump is a reciprocating pump and wherein said energy transmitting means comprises a rotor attachable to a rotating shaft to be monitored and an arm eccentrically attached to the rotor to oscillate in response to rotation thereof and also attached to said air pump to drive the pump in response to oscillation of said arm.

4. The monitoring apparatus of claim 1 wherein the dead-time thereof is not greater than about 5 seconds.

5. The apparatus of claim 1 wherein said indicator comprises a U-shaped, transparent tube with upstanding ends, one end communicating with the atmosphere and the other end communicating with the air pump, the U-shaped tube containing a visually observable liquid, whereby air under pressure from the air pump changes relative liquid levels in the U-tube, and causes air to bubble through the liquid.

6. The monitoring apparatus of claim 1 wherein the air pump, the energy transmitting means, and the air-flow indicator are provided in duplicate and wherein each of the dual energy transmitting means is adapted to transmit energy to the respective pumps in response to unidirectional rotation of the shaft, one energy transmitting means being responsive to shaft rotation in only one direction, and the other such means being responsive to shaft rotation only in the opposed direction, whereby the direction of shaft rotation may be determined by viewing which air-flow indicator shows the continuous flow of air thereto.

7. The monitoring apparatus of claim 6 wherein each energy transmitting means comprises an eccentric mounted to the shaft through a unidirectional clutch.

8. Self-monitoring apparatus for continuously monitoring the rotation of a shaft, comprising a rotor member, coupling means coupling the rotor member to a rotating shaft, a reciprocating air pump, a connecting arm eccentrically connected to the rotor member and connected to the air pump to drive the latter in response to rotation of the rotor member, a substantially instantaneously responsive air flow indicator, an air line connecting the pump and indicator and carrying air under pressure from the pump to the indicator, said indicator comprising a U-shaped, transparent tube with upstanding ends, one end communicating with the atmosphere and the other end communicating with the air pump, the indicator having an adjustable bleeder valve at its inlet for bleeding to the atmosphere before said indicator a regulated portion of the air under pressure received through the air line, the U-shaped tube containing a visually observable liquid, whereby rotation of the shaft is visually and continuously manifested by a steam of air bubbles rising in the liquid within the upstanding end of the transparent tube communicating with the atmosphere.

9. Self-monitoring apparatus for continuously monitoring the rotation of a shaft, comprising an air pump, energy transmitting means for transmitting energy from the rotating shaft to the air pump to cause the latter to emit air under pressure, a substantially instantaneously responsive air flow indicator comprising a U-shaped, transparent tube having upstanding ends, one end communicating with the atmosphere and the other end communicating with the air pump, the U-shaped tube containing a visually observable liquid, the indicator having an adjustable bleeder valve adapted to bleed to the atmosphere, before said indicator, regulated quantities of air emitted from the air pump, whereby air under pressure from the air pump changes relative liquid levels in the legs of the U-tube and causes air to bubble through the liquid.

* * * * *